United States Patent Office 3,024,165
Patented Mar. 6, 1962

3,024,165
EFFERVESCENT ACETYL-SALICYLIC ACID TABLET
Donald R. Murphy, Towson, Md., assignor to Sel-O-Min, Inc., Wilmington, Del., a corporation of Delaware
No Drawing. Filed Aug. 11, 1959, Ser. No. 832,914
1 Claim. (Cl. 167—55)

This invention relates to analgesic tablets and particularly to such tablets of improved stability and character.

Prior art tablets containing aspirin (acetyl salicylic acid) particularly in combination with citric acid phosphates and carbonates, have frequently not dissolved in water as rapidly as desired, and generally have not dissolved completely in the time desired, thus leaving a sediment or sedimentation.

Among the objects of the present invention are analgesic tablets which rapidly dissolve in water with substantially no sedimentation, which include added components for anti-neuritic properties while still giving no sedimentation, which have improved stability, which promotes effervescence at a controlled rate, tends to eliminate disagreeable after-taste, and exhibits other desirable effects.

Still further objects and advantages will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention, tableted analgesic compositions are produced desirably in unit dosage tablets, containing an aspirin (acetyl salicylic) type analgesic, with citric acid, sodium bicarbonate, mono-calcium phosphate, and an antineuritic particularly vitamin B, desirably thiamine mononitrate.

Acetylsalicylic acid (aspirin) is an analgesic or pain killer. Citric acid is an odorless, synthetic fruit acid. It improves the taste of the tablet. Sodium bicarbonate promotes effervescence and is used as an anti-acid. Mono-calcium phosphate, dibasic, is used as a mild digestive and promotes mixing of solution. Thiamine mononitrate or vitamin $B_1$ is an anti-neuritic.

The use of 100 mesh anhydrous acetylsalicylic acid promotes the dissolution of the tablet when placed in water and tends to eliminate sedimentation. The citric acid U.S.P. granular anhydrous, working with the sodium bicarbonate U.S.P. No. 140 anhydrous granular, creates effervescence and is so balanced that it becomes an alkalizer. The thiamine mononitrate U.S.P. or vitamin $B_1$ powdered is used rather than thiamine hydrochloride because of its greater stability. This ingredient is added because of the beneficial effect of vitamin $B_1$. Mono-calcium phosphate U.S.P. dibasic powdered fuses with the other ingredients and helps promote mixing of solution.

The following specific composition will illustrate the unit dose formulation all components being anhydrous and in weight by grains:

| | |
|---|---|
| Acetyl salicylic acid | 10 |
| Citric acid | 25 |
| Sodium bicarbonate | 45 |
| Monocalcium phosphate dibasic | 1/8 |
| Thiamine mononitrate | 1/65 |
| Weight per tablet | 80 73/520 |

The acetyl salicylic acid (aspirin) is U.S.P. 100 mesh. The citric acid is U.S.P. granular. The sodium bicarbonate is U.S.P. No. 140 granular. The mono-calcium phosphate and thiamin mononitrate are anhydrous powders. The thiamin mononitrate is coated with powdered anhydrous citric acid in order to protect the stability of the vitamin.

The ingredients are weighed and mixed in a special air tight laboratory room at a temperature of 70 degrees F. and at a relative humidity of between 10 and 15 degrees. The humidity factor is important because the ingredients, being anhydrous, have a tendency to absorb water. The formula is blended and mixed in a "Stokes J-21 Mixer" for 30 minutes per 12,000 tablets. The ingredients are then fed into a "Stokes DS-3" tablet press and the individual tablets are pressed at 6 tons' pressure.

Each tablet is then individually wrapped and heat sealed in a foil seal under the same temperature and humidity conditions.

The combination of ingredients, compounded and pressed into tablet form at the specified temperature, humidity and pressure controls, promotes effervescence at a controlled rate when the product is dissolved in water and tends to eliminate sedimentation. These factors, plus the use of citric acid, tends to eliminate disagreeable after taste.

The wrapping in an individual foil seal preserves the finished product from deterioration due to contact by air and absorption of moisture. Each tablet is, therefore, delivered to the user at the time of use fresh and free from contamination and absorption.

Having thus set forth my invention, I claim:

A composition tableted and sealed against moisture consisting essentially of mixed powdered components of acetyl-salicylic acid, citric acid, sodium bicarbonate, mono-calcium dibasic phosphate, and thiamin mononitrate in amounts to constitute a unit dose, all components being anhydrous, and the acetyl-salicylic acid being of 100 mesh to promote dissolution of the tablet in water and to eliminate sedimentation, the thiamin mononitrate exhibiting pronounced stability in the composition, the mono-calcium phosphate promoting intermixture of the components exhibiting controlled effervescence, the components being present in the following weights in grains:

| | |
|---|---|
| Acetylsalicylic acid | 10 |
| Citric acid | 25 |
| Sodium bicarbonate | 45 |
| Monocalcium phosphate | 1/8 |
| Thiamin mononitrate | 1/65 |

References Cited in the file of this patent
UNITED STATES PATENTS

| 2,211,485 | Zimmermann | Aug. 13, 1940 |
| 2,396,115 | Nicholls | Mar. 5, 1946 |

OTHER REFERENCES
J.A.M.A., vol. 141, No. 8, October 22, 1949 p. 549.